No. 868,568. PATENTED OCT. 15, 1907.
I. W. JONES.
ANIMAL TRAP.
APPLICATION FILED JULY 15, 1907.
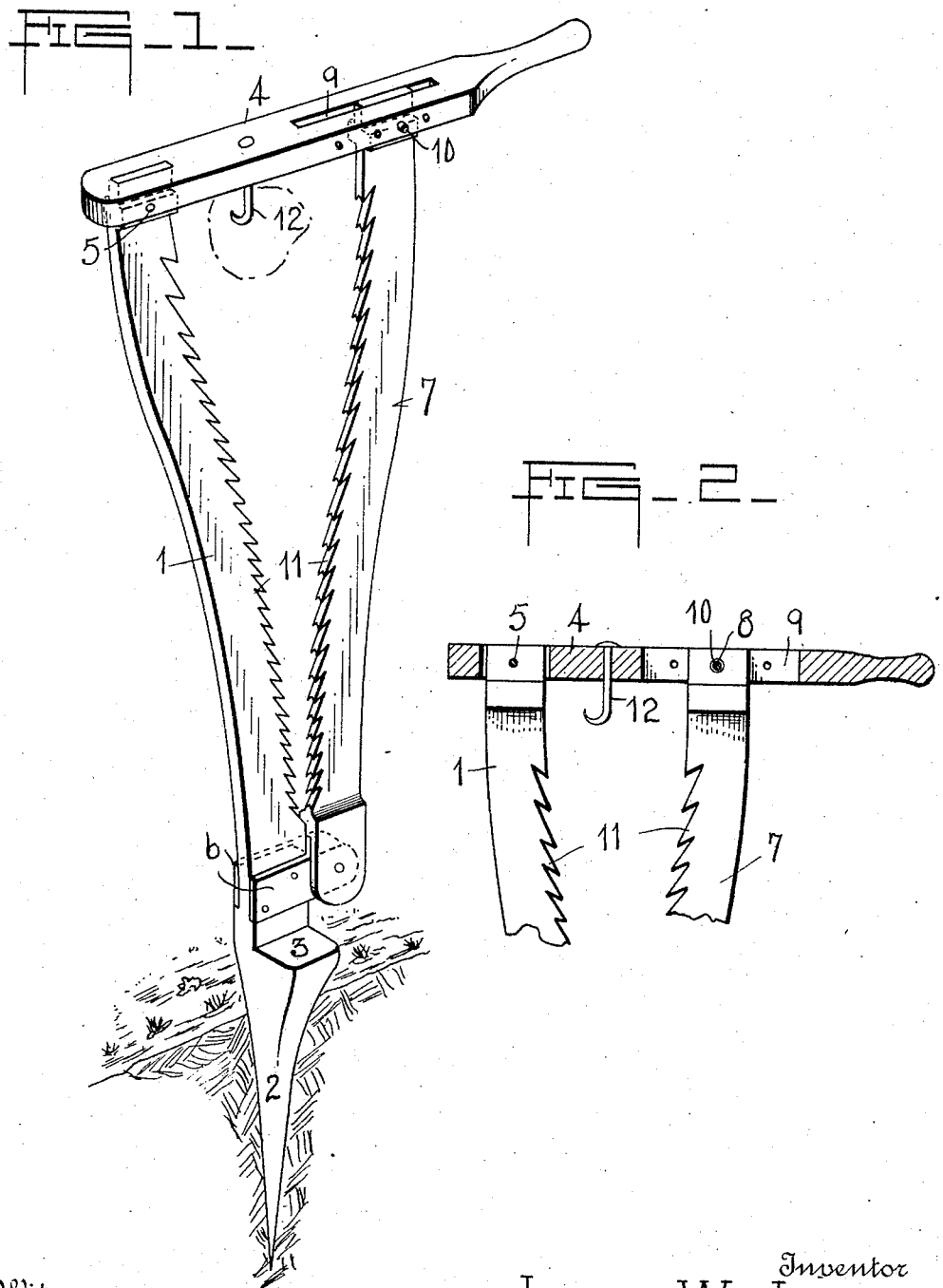
Witnesses
L. B. James
C. H. Guesbauer
Inventor
ISAAC W. JONES
by H. B. Willson & Co.
Attorneys

UNITED STATES PATENT OFFICE.

ISAAC W. JONES, OF GAP, TEXAS.

ANIMAL-TRAP.

No. 868,568.   Specification of Letters Patent.   Patented Oct. 15, 1907.

Application filed July 15, 1907. Serial No. 383,853.

To all whom it may concern:

Be it known that I, ISAAC W. JONES, a citizen of the United States, residing at Gap, in the county of Comanche and State of Texas, have invented certain new and useful Improvements in Animal-Traps; and I do declare the following to be a full, clear, and exact description of the invention, such as will enable others skilled in the art to which it appertains to make and use the same.

This invention has relation to new and useful improvements in animal traps, and while it is especially designed as a wolf trap, it may be employed for catching various other kinds of animals.

One of the principal objects of the invention is to provide a trap of this character of simple and inexpensive construction and capable of adjustment.

In the accompanying drawings,—Figure 1 is a perspective view of a trap constructed in accordance with the invention; Fig. 2 is a longitudinal section taken through the connecting bar and the upper ends of the side bars.

In the embodiment illustrated, and as shown in the drawings, the trap comprises a fixed side bar 1, provided at its lower end with a longitudinally disposed pin 2, adapted to be driven in the ground to set or secure the trap in position, which operation is facilitated by providing the inner or upper end of the pin with a shoulder or offset portion 3, to strike with a hammer or other suitable device.

A horizontally disposed connecting bar 4, is provided near one end with a longitudinal slot to receive the upper end of said side bar, to which it is loosely connected by a pin 5 working through the slotted end of the connecting bar and the upper end of said side bar, the slot of the connecting bar being somewhat larger than the width of the side bar to permit of a limited movement of the connecting bar.

A horizontally disposed bearing bar 6, having a longitudinal recess in one end to receive the lower end of said side bar, is secured thereto in any suitable manner, and pivoted to the outer end of said bearing is the lower bifurcated end of a side bar 7. The free or upper end of said pivoted side bar is provided with a transverse aperture 8, and is adapted to be received by a central longitudinal slot 9, near the free end of said connecting bar, in which slot it may be adjusted by passing a pin 10 through the aperture therein and through one pair of transversely alined apertures of two longitudinal series one formed adjacent said slot 9 in the connecting bar in each face thereof. Each of said side bars is provided at its inner edge with a plurality of downwardly inclined teeth 11 of gradually diminishing length, the sharp or inner ends of the teeth being notched out to form oppositely disposed cutting points.

The numeral 12 denotes a suitable bait holder arranged to depend from the connecting bar between the upper ends of the side bars.

The purpose of adjustably connecting the free end of the pivoted side bar to the connecting bar is to enable the trap to be adjusted to meet all requirements. The teeth on the inner edges of the side bars are inclined downward to prevent the escape of any animal that may have been caught in the trap.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention.

Having described my invention, what I claim as new and desire to secure by Letters-Patent, is:—

1. In a trap of the character described, the combination with a side bar having a pin at one end and teeth on one edge, of a second side bar having teeth on one edge, pivoted to one end of said first mentioned side bar, and means for adjustably connecting the free end of said pivoted bar with the adjacent end of the other bar, substantially as described.

2. In a trap of the character described, the combination with a stationary side member having a plurality of downwardly inclined teeth of gradually diminishing length, of a second side member having teeth to correspond with said stationary side member, pivotally connected thereto, and means for adjustably connecting the free end of the pivoted member with the adjacent end of the stationary side member, substantially as described.

3. In a trap of the character described, the combination with a stationary side member having downwardly inclined teeth on one edge, of a horizontally disposed connecting bar pivotally connected to the outer end of the side member, said bar having a longitudinal slot near its free end, and a second side member having teeth to correspond with teeth of the stationary member pivotally connected thereto in position to have its free end received by the slot of the connecting bar, substantially as described.

4. A trap of the character described comprising two vertically disposed side members having downwardly inclined teeth on their inner edges, one of the members being pivotally connected to the other, and a connecting bar disposed at right angles to the plane of the side members for adjustably connecting the free end of the pivoted member to the other member, substantially as described.

In testimony whereof I have hereunto set my hand in presence of two subscribing witnesses.

ISAAC W. JONES.

Witnesses:
C. L. WHITE,
G. B. VINSON.